(12) United States Patent
Justis et al.

(10) Patent No.: US 12,547,972 B2
(45) Date of Patent: Feb. 10, 2026

(54) METHODS AND APPARATUS TO FACILITATE PICK-UP OF PACKAGES

(71) Applicant: Returned.com, Inc., Boulder, CO (US)

(72) Inventors: Patrick A. Justis, Longmont, CO (US); Paul Pao-Yen Lin, Boulder, CO (US)

(73) Assignee: Returned.com, Inc., Boulder, CO (US)

( * ) Notice: Subject to any disclaimer, the term of this patent is extended or adjusted under 35 U.S.C. 154(b) by 0 days.

(21) Appl. No.: 18/903,723

(22) Filed: Oct. 1, 2024

(65) Prior Publication Data

US 2025/0371488 A1    Dec. 4, 2025

Related U.S. Application Data

(60) Provisional application No. 63/652,498, filed on May 28, 2024.

(51) Int. Cl.
| | |
|---|---|
| *G06Q 10/0836* | (2023.01) |
| *G06T 7/00* | (2017.01) |
| *G06V 20/80* | (2022.01) |

(52) U.S. Cl.
CPC ......... *G06Q 10/0836* (2013.01); *G06T 7/001* (2013.01); *G06V 20/80* (2022.01)

(58) Field of Classification Search
CPC ..... G06Q 10/0836; G06V 20/80; G06T 7/001
See application file for complete search history.

(56) References Cited

U.S. PATENT DOCUMENTS

| | | | |
|---|---|---|---|
| 10,627,244 B1 * | 4/2020 | Lauka | ................ G01C 21/3623 |
| 11,107,029 B1 | 8/2021 | Henry et al. | |
| 11,144,868 B1 | 10/2021 | McBride et al. | |
| 2001/0047315 A1 | 11/2001 | Siegel | |
| 2015/0100514 A1 | 4/2015 | Parris | |
| 2015/0254906 A1 * | 9/2015 | Berger | ..................... B07C 3/00 382/101 |

(Continued)

FOREIGN PATENT DOCUMENTS

| | | |
|---|---|---|
| WO | 2012178047 A1 | 12/2012 |
| WO | 2017035532 A1 | 3/2017 |

OTHER PUBLICATIONS

Christian Wolff, Location Based Logistics Services and Event Driven Business Process Management, 2009, p. 167-167 (Year: 2009).*

(Continued)

*Primary Examiner* — Ibrahim N El-Bathy
(74) *Attorney, Agent, or Firm* — Hanley, Flight & Zimmerman, LLC

(57) ABSTRACT

Systems, apparatus, articles of manufacture, and methods to facilitate pick-up of packages are disclosed. Example machine-readable instructions cause at least one processor circuit to at least access a list of markings associated with an intended package to be collected for delivery to a destination location, access an image that includes at least a portion of a potential package, the image including a first marking of the potential package, the first marking not used for transportation of the potential package to the destination location, compare the first marking to a second marking in the list of markings, and when the first marking matches the second marking, identify the potential package as the intended package.

11 Claims, 14 Drawing Sheets

(56) References Cited

U.S. PATENT DOCUMENTS

| | | | |
|---|---|---|---|
| 2015/0302495 A1* | 10/2015 | Stuckman | G06T 19/006 |
| | | | 705/26.35 |
| 2016/0232489 A1* | 8/2016 | Skaaksrud | G06Q 10/0836 |
| 2019/0392445 A1 | 12/2019 | Klausner et al. | |
| 2023/0281555 A1 | 9/2023 | Zalch | |
| 2024/0338711 A1 | 10/2024 | Friesen et al. | |

OTHER PUBLICATIONS

'No Package, no problem,' usps.com, dated Sep. 17, 2019, 3 pages.

\* cited by examiner

METHODS AND APPARATUS TO FACILITATE PICK-UP OF PACKAGES

RELATED APPLICATION

This patent claims the benefit of U.S. Provisional Patent Application No. 63/652,498, which was filed on May 28, 2024. U.S. Provisional Patent Application No. 63/652,498 is hereby incorporated by reference in its entirety. Priority to U.S. Provisional Patent Application No. 63/652,498 is hereby claimed.

FIELD OF THE DISCLOSURE

This disclosure relates generally to package transit and, more particularly, to methods and apparatus to facilitate pick-up of packages.

BACKGROUND

In recent years, increases in commercialism and digital advertising have led to a rise in consumer purchasing. In many examples, a consumer may purchase a product and later desire to take any number of actions relating to the product, such as returning the product. In some examples, a courier may be dispatched to pick up the item as part of the return process.

Figure 1:
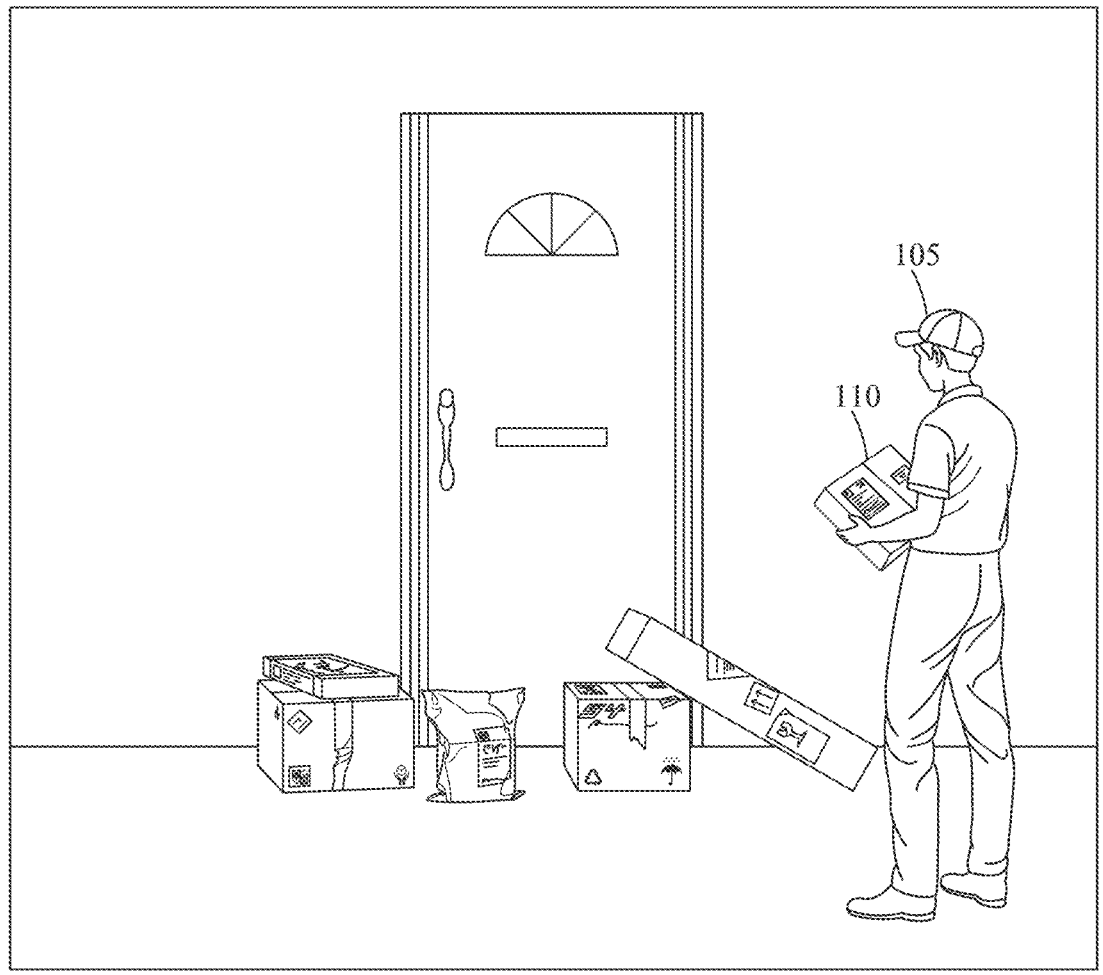
FIG. 1 is an illustration of a courier attempting to collect a package.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

A consumer may decide to take a number of actions with respect to a purchased product. For example, a consumer may wish to return the product. In examples disclosed herein, a return coordinator server coordinates return of the product. In some examples, the product is to be provided back to the entity (e.g., a retailer) from which the product was purchased. Alternatively, the entity may request that the product be provided to another location (e.g., mail the item to a donation location, a product manufacturer, a wholesaler, etc.). In such examples, the return coordinator server may coordinate a drop off of the product at a specified location. In such an example, the consumer may then be requested to package the product and deliver it to a specified location (e.g., a courier drop-off location, a storefront, etc.).

In such an example, the drop-off of the package may be inconvenient for the consumer, resulting in a delay and/or non-completion of the requested return. To that end, in some examples, the return coordinator server may coordinate a pick-up of the item from a location of the consumer. For example, the consumer may be instructed to package the product and leave it at their front doorstep, in a mailroom of a housing complex, at a specified location that is convenient for the consumer, etc. However, when multiple packages are left at a same location, it can become difficult for a courier to accurately and/or efficiently identify a package that they are to collect.

Examples disclosed herein enable efficient identification and pickup of packages left by consumers, even when multiple packages are left at the same location. In examples disclosed herein, barcodes and/or other identifying markings on the package, which might not have been for the original purpose of identification to the courier, may be utilized. By tracking barcodes and other identifying markings on the package, the return coordinator server stores consumer-scanned information to facilitate the courier with accurate and timely retrieval. In this manner, the examples disclosed herein avoid errors and reduce time spent locating the correct package by not relying solely on transport-related markings.

In some instances, when multiple packages are left at one location, it becomes difficult for couriers to determine which package is intended for pickup. To address this issue, when a consumer leaves a package at a pickup location, the consumer uses a mobile device (e.g., a smartphone, a tablet, etc.) to scan identifying markings on the package. In some examples, the identifying markings may be scanned prior to leaving the package at the pickup location (e.g., barcodes may be scanned inside the consumer's home prior to leaving the package outside of the consumer's home). The identifying markings are provided to the return coordinator server, where they are stored and later used when the courier arrives to collect the package. Because some packages include many different markings, and only some of such markings are utilized for courier tracking and/or delivery purposes, examples disclosed herein enable the non-transit related markings to be used to confirm the identity of the package.

When the courier arrives at the location, they can efficiently identify the correct package by scanning packages until a matching identifying marking is found. Because packages may be positioned in any orientation, and transit-related markings are not always readily visible to a courier, the examples disclosed herein reduce the need for the courier to move and/or lift packages to attempt to identify whether it is the intended package. This innovative approach enables accurate identification of the intended package without relying solely on transport-related markings, thus reducing errors and minimizing time spent locating the right package for pickup.

Example approaches disclosed herein improve the coordinated return process between consumers, retailers, and couriers, ultimately enhancing overall customer satisfaction and streamlining logistics management.

FIG. 1 is an illustration of a courier 105 attempting to collect a package 110. In the illustrated example of FIG. 1, the courier 105 is attempting to collect the package 110 at the front door of a consumer location. In this example, multiple packages are visible on the ground in front of the door, with six packages shown here as an example. However, any number of packages may be placed at and/or near the pickup location.

In the illustrated example of FIG. 1, the courier 105 has picked up the package 110 to inspect it for a transport-related marking. As evident in FIG. 1, when multiple packages are awaiting pickup, identifying the correct package using only transport-related markings can be challenging and time-consuming. The courier may need to manipulate or move several packages to reveal hidden markings or ensure that they have examined all available packages for the intended one.

In this manner, FIG. 1 illustrates the problems associated with the existing approach where a courier has to physically handle multiple packages in order to identify the correct package for collection. This process can be labor-intensive, time-consuming, and error-prone, leading to potential delays or misidentification of packages during coordinated returns. As explained below, examples disclosed herein address these challenges by streamlining the pickup process for couriers while minimizing errors and reducing the amount of time spent locating the correct package.

Figure 2:
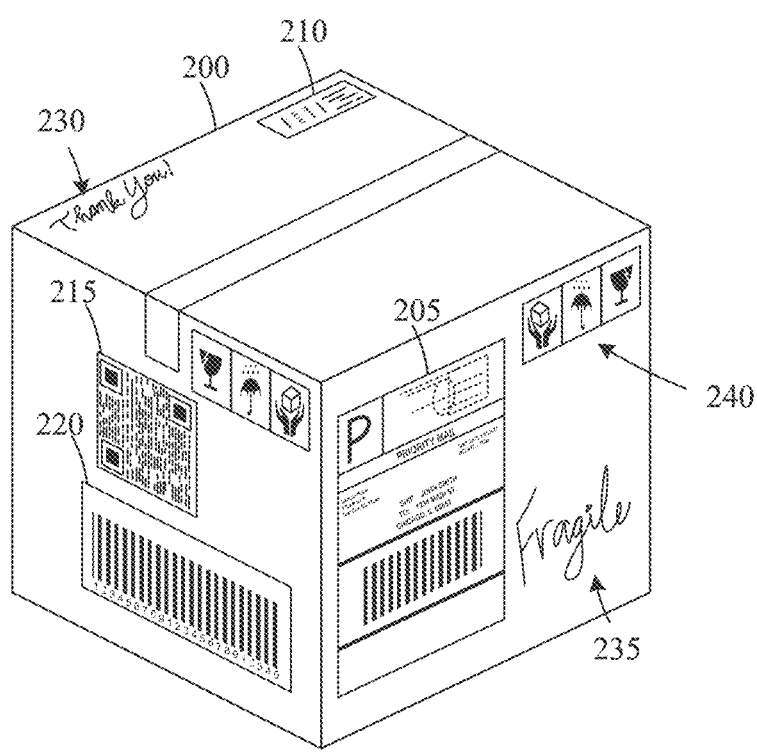
FIG. 2 is an illustration of a package including a plurality of identifying markings, including transit-related and non-transit-related identifiers.

FIG. 2 is an illustration of a package 200 including a plurality of identifying markings, including transit-related and non-transit-related identifiers. In the illustrated example of FIG. 2, the package 200 is a box. The package 200 of FIG. 2 contains a product inside the box, but it should be noted that in some examples, the package may represent packaging of the product itself. Moreover, different types of packaging may be used including, for example, polybags. In this manner, the consumer is enabled to use any package to return an item including, for example, a package that was not initially used to receive the item. Examples disclosed herein also avoid the need for a consumer to print a shipping and/or pickup label and affix the label to the package. In other words, existing markings on the package may be re-used to assist in the identification of the package for pick-up purposes. Such approaches result in re-use and/or recycling of shipping materials, thereby reducing the likelihood that such shipping materials are sent to landfills as trash. Thus, examples disclosed herein provide a benefit to the environment by reducing waste.

A plurality of markings are shown on the example package 200 of the illustrated example of FIG. 2. A transit-related identifier (205) is used for transport purposes, such as shipping labels or other markings required by carriers to facilitate transit and delivery. In this example, the transit-related identifier 205 helps identify the intended recipient and destination information.

The example package 200 includes a printed note 210, that might be useful for logistics purposes within a warehouse setting (e.g., at an Amazon warehouse). In some examples, this note 210 may be a barcode and/or other electronically recognizable marking. However, this marking is not directly usable for transit-related purposes and does not include information traditionally utilized by couriers during pickup.

The example package 200 of FIG. 2 includes a quick response (QR) Code 215: The QR code 215 might be useful to the consumer for initiating a return of the product and/or obtaining other information about the product and/or the delivery thereof. In examples disclosed herein, by scanning the QR code, consumers can access relevant information about returning the item and coordinate with the retailer or return coordinator server. However, in the context of package identification, this QR code 215 can be utilized to facilitate package identification, rather than initiating a return.

The example package 200 of FIG. 2 includes a barcode (e.g., SKU) 220. In some examples, the barcode 220 might be used to identify the product inside the box (e.g., without using a human-readable identifier). In some examples, this barcode is traditionally useful to the retailer for inventory management and tracking purposes, and does not contain information directly relevant to couriers during pickup.

In the illustrated example of FIG. 2, the example package 200 includes written text 230, 235. The written text 230, 235 (e.g., handwritten) may be useful for identifying shipping considerations (e.g., the word "fragile"), or might have been used to identify an apartment or mailbox number when the package was previously used for a delivery.

In some examples, other logos, icons, and/or imagery 240 may be included on the package. The exterior of the package displays written text, imagery (e.g., brand logos), and other icons that provide additional information about the product, its manufacturer, shipping instructions, etc. In some examples, the consumer may be requested to place an additional marking on the package (e.g., write the following sequence of characters "ABC123") to assist in better distinguishing the package from other packages nearby at the pickup location.

Figure 3:
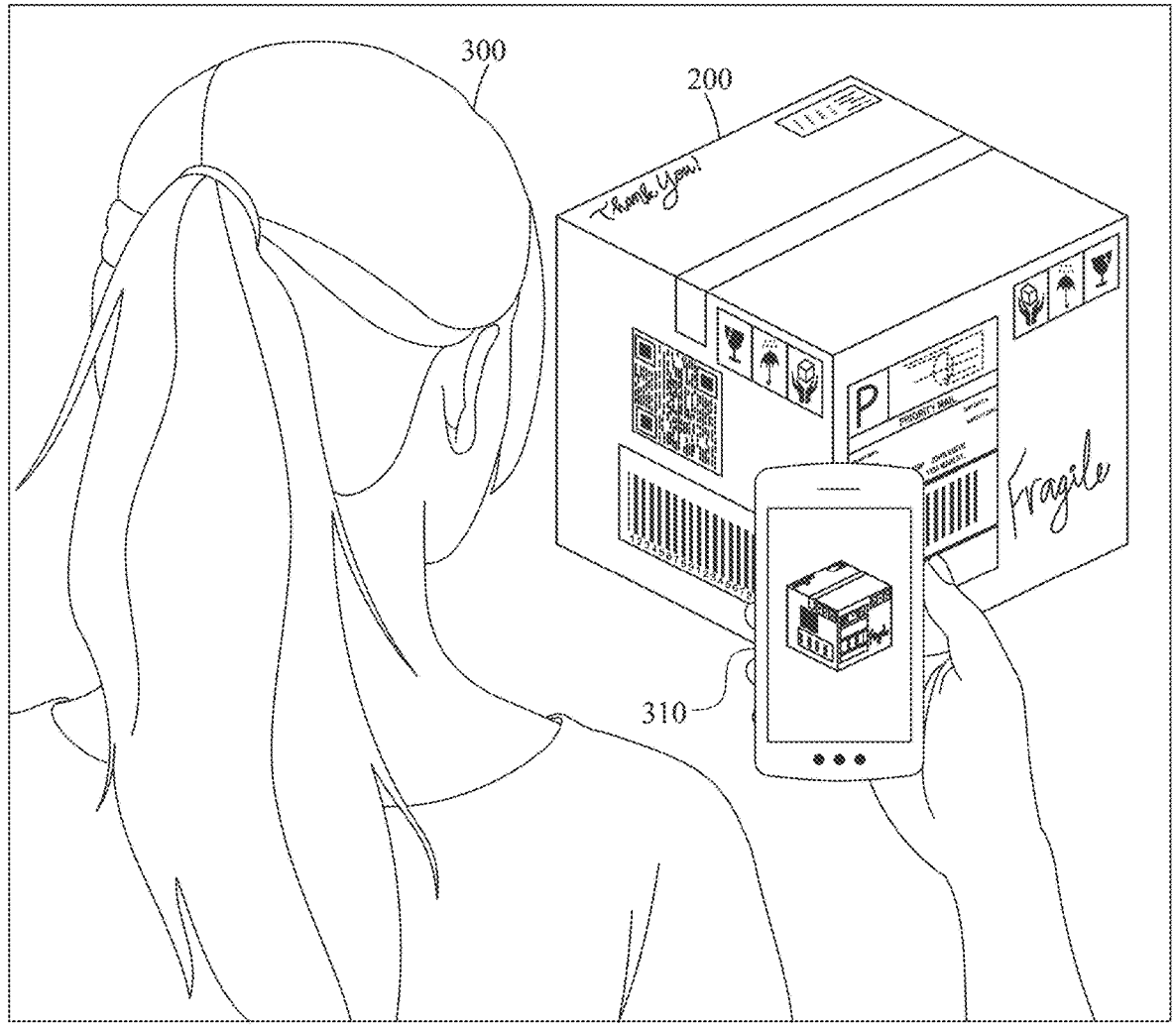
FIG. 3 is an illustration of a consumer scanning one or more of the plurality of identifying markings of FIG. 2.

FIG. 3 is an illustration of a consumer 300 scanning one or more of the plurality of identifying markings of FIG. 2.

In the illustrated example of FIG. 3, a consumer 300 is utilizing their mobile device 310 to scan identifying markings present on the package 200. This interaction may involve scanning (e.g., capturing images of) QR codes or barcodes (e.g., SKU), as well as written text and logos/icons present on the exterior of the package 200.

To complete the scanning, the consumer 200 captures images of the package's identifying markings using their mobile device until no additional markings exist (or a sufficient number of markings have been identified), ensuring that they capture all relevant information available on the exterior of the box to enable later identification by the courier. This process may involve scanning multiple sides of the package and/or reaching a predetermined threshold number of markings (e.g., four markings). In some examples, additional information and/or metadata is collected as part of the image capturing procedure including, for example, a location of the consumer device 310 (e.g., via global positioning system (GPS) coordinates), a direction that the device is facing (e.g., via a compass and/or other sensor), etc. Such additional information may be stored in an exchangeable image file (EXIF) format. Such additional information may later be used to facilitate collection of the package. In some examples, such information is captured separately from the image.

In the illustrated example of FIG. 3, the mobile device 310 is equipped with a camera and machine-executable instructions capable of interpreting various types of markings, such as QR codes, barcodes, written text, logos/icons, etc. This functionality allows the consumer 300 to interact efficiently with packages by accessing relevant information without manual data entry or physical contact.

Figure 4:
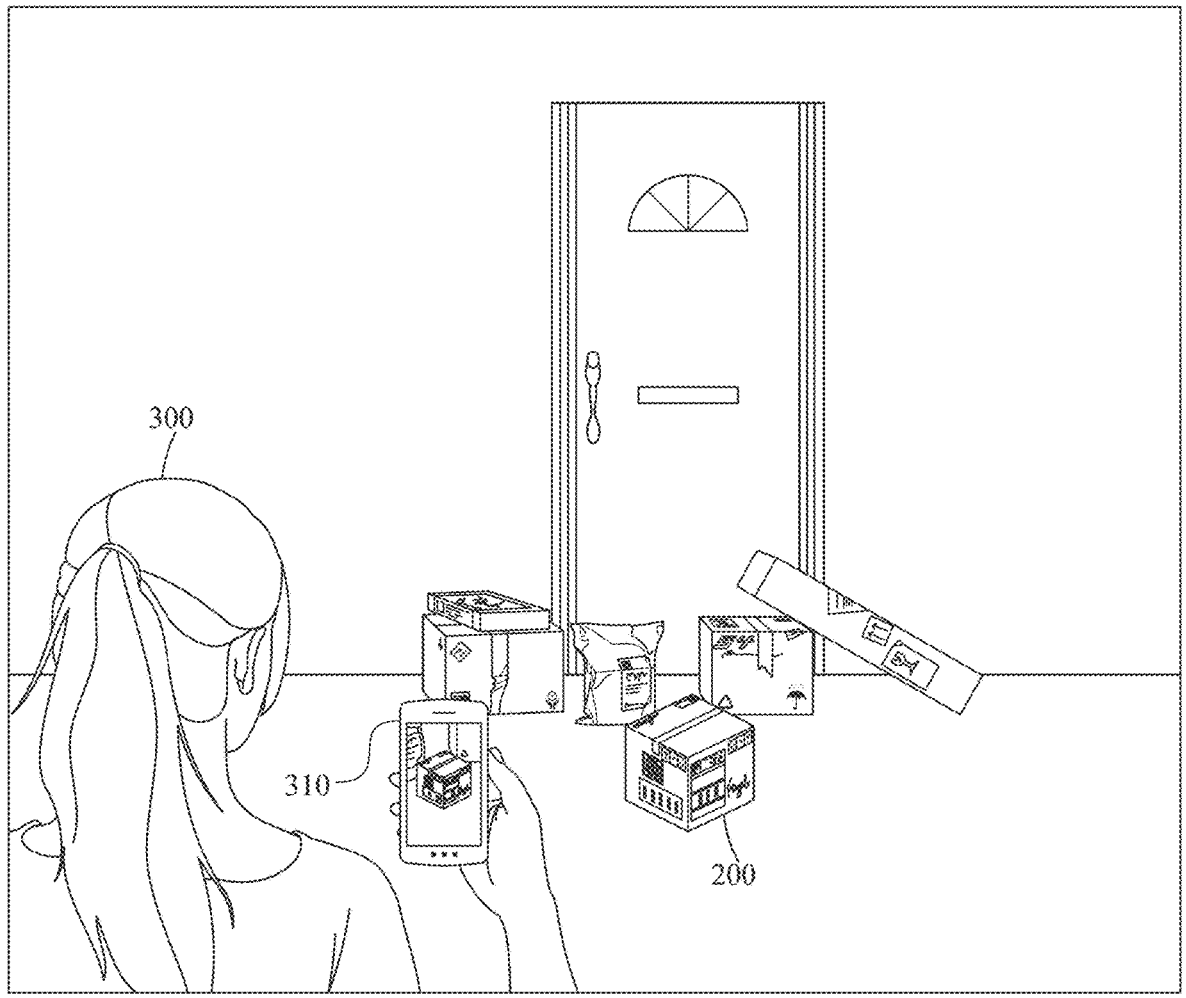
FIG. 4 is an illustration of the consumer of FIG. 3 capturing an image of a package as the package is being left for pickup by a courier.

FIG. 4 is an illustration of the consumer 300 of FIG. 3 capturing an image of a package as the package is being left for pickup by a courier. FIG. 4 illustrates a scenario where the consumer 300 uses their mobile device 310 to capture an image of the package 200 once it has been placed in a pickup location, such as at the front door. This process helps assist couriers by providing visual information about the package's context within its surroundings and serves as an indication that the package is ready for dispatch.

By capturing an image of the package as the package is being left at the pickup location, the consumer 300 inadvertently assists the courier by providing valuable information about the general shape, color, size, etc., of the package within its environment. This can be particularly helpful when multiple packages are located at a single address or if there are similar-looking packages from different consumers (e.g., in a mailroom of an apartment complex).

In some examples, the image captured by the consumer also serves as an indication that the package is ready for collection. Couriers can use this information to prioritize their route and ensure they collect all packages left at the pickup location efficiently, reducing the likelihood of delays or missed (or incorrectly identified) packages.

In summary, FIG. 4 demonstrates how capturing an image of a package as it is placed in a pickup location using a mobile device can benefit both consumers and couriers by providing visual information about the package's context within its surroundings, assisting with identification and retrieval, and serving as an indication that the package is ready for collection.

Figure 5:
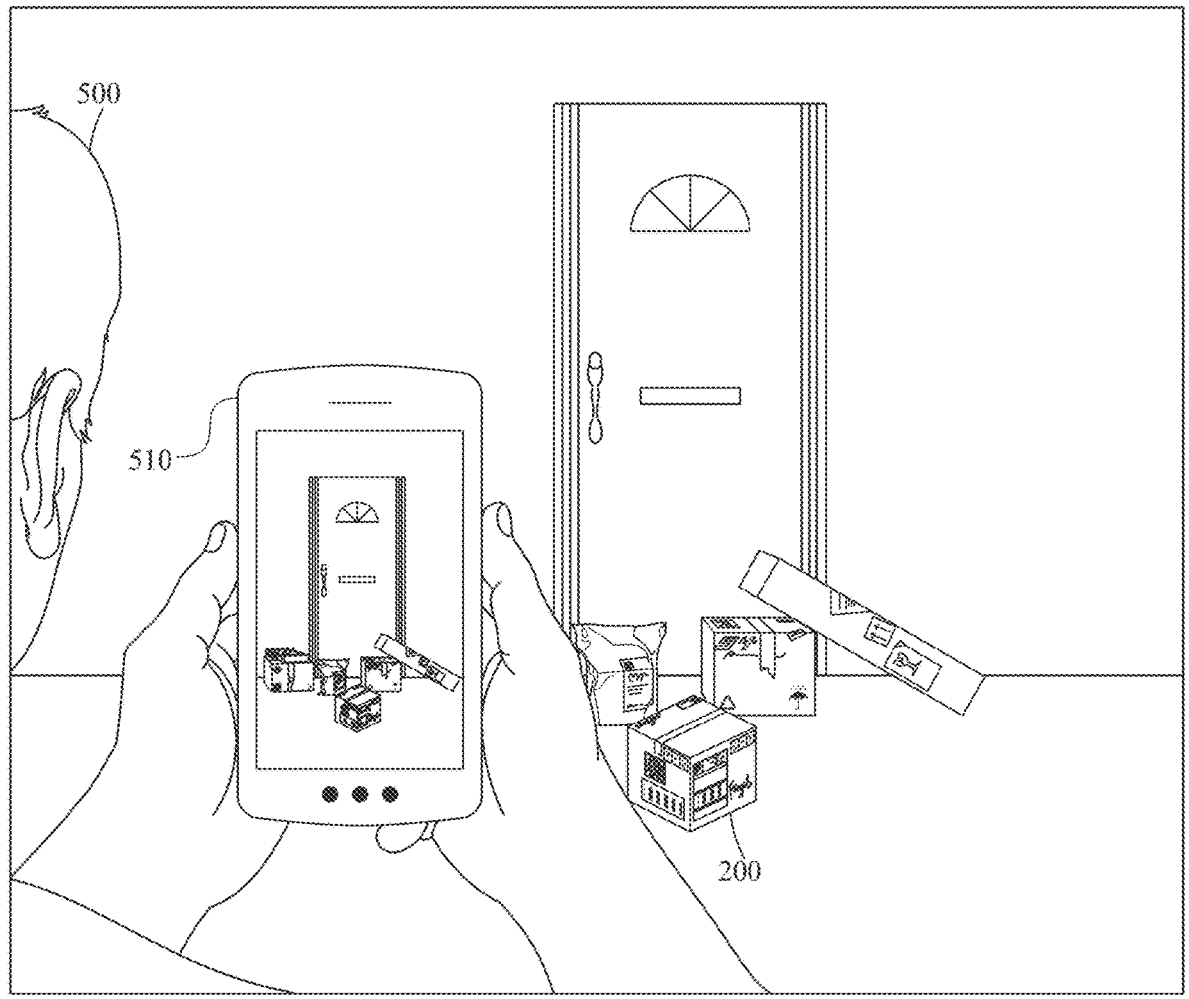
FIG. 5 is an illustration of a courier scanning markings to identify a package to be picked up.
Figure 6:
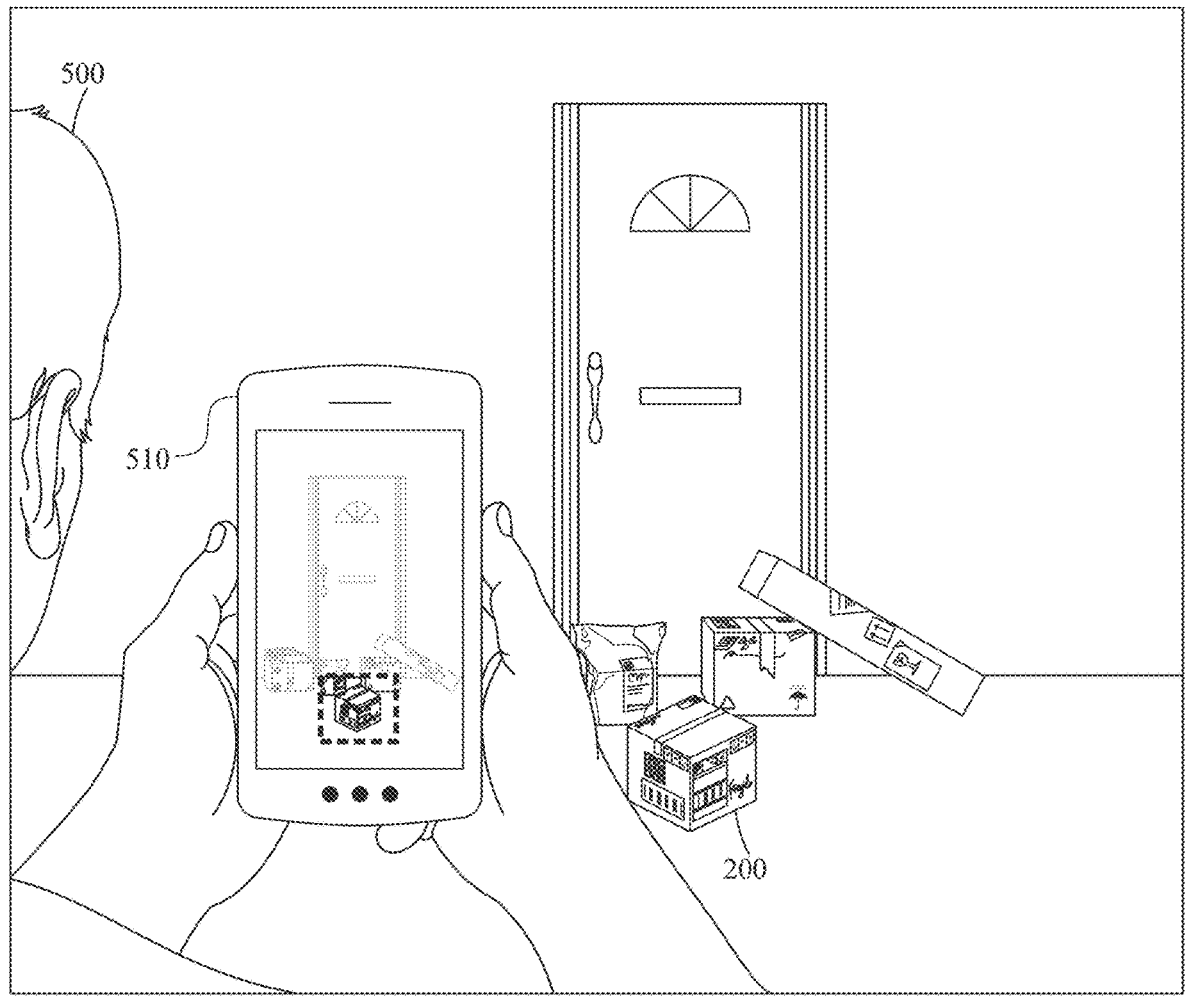
FIG. 6 is an illustration of the package to be picked up being identified by the mobile device operated by the courier.

FIG. 5 is an illustration of a courier scanning markings to identify a package to be picked up, and FIG. 6 is an illustration of the package to be picked up being identified by the mobile device operated by the courier. FIGS. 5 and 6 illustrate a scenario where a courier 500 uses their mobile device 510 to scan identifying markings on packages at the pickup location in order to identify the package they intend to collect. In the illustrated example of FIG. 5, the courier 500 is standing with multiple packages within the camera frame of their mobile device 510, and machine-readable instructions executed by the processor circuitry of the mobile device 510 enable the mobile device 510 to analyze the markings on each package and differentiate them from one another. In some examples, this may involve decoding barcodes, performing image recognition, performing character recognition, etc.

In FIG. 5, the courier 500 scans identifying markings on packages at the pickup location using their mobile device 510. Machine-readable instructions executed by the mobile device 510 enable the mobile device 510 to analyze the markings on each package to identify which package is intended for collection.

Once the mobile device 510 has identified the intended package, the user interface of the mobile device 510 updates, as is shown in FIG. 6, to highlight and/or otherwise identify that particular package (e.g., by graying out non-highlighted portions). While in the illustrated example of FIG. 6, the user interface illustrates a highlighting of the identified package, other approaches to alerting the courier 500 that the package is within view and/or nearby may additionally or alternatively be used. For example, audio indicators (e.g., beeps, sounds, etc.) may be emitted to indicate a proximity of the package. Such proximity of the package may be determined based on, for example, visual inspection (e.g., image analysis), geographical information (e.g., a comparison of a location and/or direction of the courier device to the location and/or direction of the consumer device when an image of the package was captured.) In some examples, screen flashes may be used to provide an indication to the courier that the package is in-view and/or nearby. This visual distinction helps the courier quickly recognize which package they need to collect among multiple packages at the pickup location. Of course, other visual aids may additionally or alternatively be used to efficiently identify a package to a courier for collection.

The approach illustrated in FIGS. 5 and/or 6 allows couriers to efficiently identify and select the correct package for collection, reducing the likelihood of errors or delays due to misidentification or confusion between similar-looking packages from different shippers.

Figure 7:
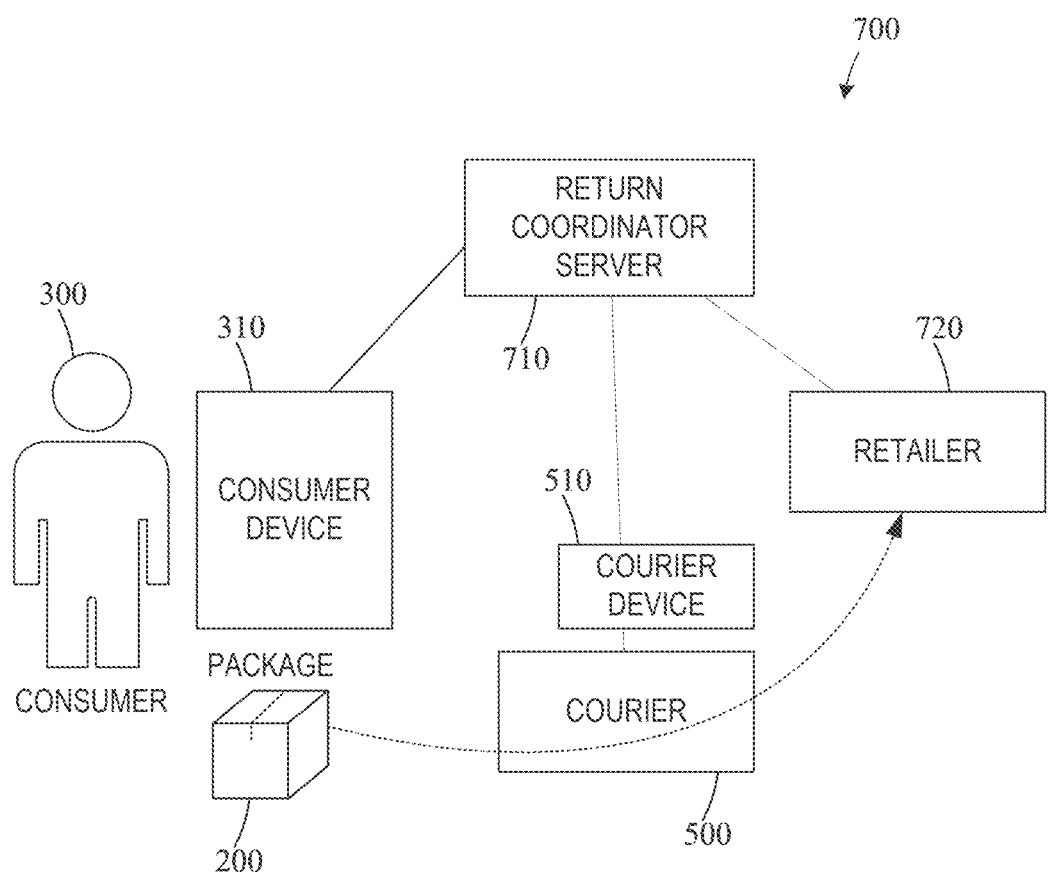
FIG. 7 is a block diagram of an example environment in which an example return coordinator server operates to coordinate return of an item to a retailer.

FIG. 7 is a block diagram of an example environment 700 in which an example return coordinator server 710 operates to coordinate return of an item to a retailer 720. While examples disclosed herein are described in the context of a return of an item, many other actions may be taken with respect to a purchased item. For example, the return coordinator server 710, instead of interacting with the retailer 720, may interact with a third party (e.g., a marketplace) to purchase the item from the consumer 300. In some examples, the return coordinator server 710 may facilitate donation of the item.

The example consumer 300 of the illustrated example of FIG. 7 represents a user and/or other person or entity that may wish to perform an action with respect to a purchased product including, for example, returning the item. In FIG. 7, the consumer 300 interacts with the return coordinator 710 server using their consumer device 310 (e.g., a smartphone or tablet). The consumer may be instructed by the return coordinator server 710 to capture identifying markings of the package 200 containing the item they wish to return using a camera of the consumer device 310.

The consumer device 310 serves as an interface between the consumer and the return coordinator server 710, enabling communication and interaction with the return coordination server 710 via an application (e.g., a return application). In examples disclosed herein, the consumer device 310 includes a camera and/or other image sensor for capturing identifying markings of the package 200.

The consumer device 310 of FIG. 7 may be instantiated (e.g., creating an instance of, bring into being for any length of time, materialize, implement, etc.) by programmable circuitry such as a Central Processor Unit (CPU) executing first instructions. Additionally or alternatively, the consumer device 310 of FIG. 7 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 7 may, thus, be instantiated at the same or different times. Some or all of the circuitry of FIG. 7 may be instantiated, for example, in one or more threads executing concurrently on hardware and/or in series on hardware. Moreover, in some examples, some or all of the circuitry of FIG. 7 may be implemented by microprocessor circuitry executing instructions and/or FPGA circuitry performing operations to implement one or more virtual machines and/or containers.

In this manner, an application (e.g., a return application) may be executed by the processor circuitry of the example consumer device 310 to execute the instructions described in connection with the flowchart of FIG. 9.

In the illustrated example of FIG. 7, the item to be returned is contained within the package 200, which has unique identifying markings on it. These markings could be barcodes, QR codes, or other visual identifiers. In examples disclosed herein, these markings include identifiers that are not ordinarily for use by a courier and/or other transportation carrier. In some examples, the package may also include relevant information about the contents (e.g., size, weight) to facilitate proper handling during transportation.

The example return coordinator server 710 of the illustrated example of FIG. 7 acts as an intermediary between the consumer and retailer in coordinating returns. The example return coordinator server 710 receives requests from consumers to coordinate a return, and coordinates the return with the retailer 720.

The example return coordinator server 710 of the illustrated example of FIG. 7 interacts with the retailer 720 and/or third-party systems to obtain information and/or coordinate an action initiated by the consumer 300 (e.g., coordinate a return of an item). To do so, the example return coordinator server 710 utilizes one or more machine learning models, LLMs, etc. to prepare messages to be used to interact with the retailer and/or third-party systems on behalf of the consumer. Such interactions are disclosed in U.S. Provisional Patent Application No. 63/495,963, and U.S. patent application Ser. No. 18/633,327, both of which are incorporated by reference in their entireties. Such interaction may be conducted with the retailer and/or third-party systems via, for example, a web-based user interface, a chat bot, email messages, text messages, audio messages, etc. For example, the return coordinator server 710 interacts with the retailer on behalf of the consumer to coordinate return of an item, and then subsequently provides instructions to the consumer 300 concerning completion of the return. Such instructions may indicate to the consumer 300 that they are to place an item in the package 200 on their doorstep and that a courier service 500 has been scheduled to retrieve the item. Such instructions may further request that the consumer 300 use their device to capture identifying markings of the package in accordance with the process of FIG. 9. The return coordinator server may store identifying markings captured by the consumer device to facilitate efficient pickup of the package by the courier.

Later, the example return coordinator server 710 may interact with the courier 500 (and/or the courier device 510) to facilitate confirmation of the identity of the package. For example, the example return coordinator server 710 may review identifying markings identified by the courier 500 and/or courier device 510 and inform the courier 500 as to whether the correct package has been identified. Alternatively, as explained in FIG. 10, below, the example return coordinator server 710 may provide marking information to the courier 500 to enable the courier to determine whether the correct package has been identified.

The example courier 500 represents a transportation entity and/or any other entity that is to retrieve a package for delivery from the consumer to another scheduled destination. In other words, the courier 500 may represent a traditional carrier (e.g., the United States Postal Service (USPS), United Parcel Service (UPS), Federal Express (FedEx), etc.), or other local carrier services (e.g., a Uber package delivery service). As noted above, once a return has been authorized and scheduled, the return coordinator server 710 can dispatch a courier 500 to collect the item from the consumer's location (e.g., the pickup location). The courier 500 uses computing components such as GPS-enabled devices, like the courier device 510, and/or dedicated fleet management systems for efficient route planning and tracking purposes.

The example courier device 510 is a device (e.g., a smartphone, a tablet, etc.) operated by the courier 500. In some examples, the courier device 510 is equipped with Global Positioning System (GPS) capabilities that enable real-time tracking of a location of the courier device. Location tracking enables efficient route planning and optimization by both the courier service and/or the return coordinator server 710. In some examples, this helps in minimizing travel time between pickup locations while ensuring timely delivery or collection of packages.

The example courier device 510 is used to scan identifying markings during pickup of a package, enabling the courier 500 to verify that they have the correct item for return or delivery. In some examples, the courier device 510 includes a camera and/or other image capture circuitry to enable capturing of images of such identifying markings. Moreover, the courier device 510 may analyze such images to attempt to extract the identifying markings in a format to permit accurate package identification.

In some examples, the courier device 510 enables the courier 500 to update package statuses (e.g., picked up, in transit) within their devices, which enable real-time tracking via the return coordinator server 710. Such information may then be visible to the consumer 300 and/or the retailer 720, ensuring transparency throughout the return process and helping to manage expectations regarding delivery or pickup times.

In some examples, courier devices 510 may also be used to capture electronic signatures, photographs, or other documentation as proof of successful package deliveries or pickups. This information can then be shared with the return coordinator server 710, consumer 300, and/or retailer 720 for record-keeping purposes.

The example courier device 510 of FIG. 7 may be instantiated (e.g., creating an instance of, bring into being for any length of time, materialize, implement, etc.) by programmable circuitry such as a Central Processor Unit (CPU) executing first instructions. Additionally or alternatively, the courier device 510 of FIG. 7 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 7 may, thus, be instantiated at the same or different times. Some or all of the circuitry of FIG. 7 may be instantiated, for example, in one or more threads executing concurrently on hardware and/or in series on hardware. Moreover, in some examples, some or all of the circuitry of FIG. 7 may be implemented by microprocessor circuitry executing instructions and/or FPGA circuitry performing operations to implement one or more virtual machines and/or containers.

In this manner, an application (e.g., a return application) may be executed by the processor circuitry of the example courier device 510 to execute the instructions described in connection with the flowchart of FIG. 10.

The example retailer 720 of the illustrated example of FIG. 7 retailer is responsible for managing return policies, verifying eligibility of returned items, processing refunds or exchanges, and updating inventory accordingly. The retailer 720 may have their own internal server system that communicates with the return coordinator server 710 to receive updates on returns and/or manage associated tasks.

While an example manner of implementing the example consumer device 310, the example courier device 510, and/or the example return coordinator server 710 of FIG. 7 are illustrated in FIG. 7, one or more of the elements, processes, and/or devices illustrated in FIG. 7 may be combined, divided, re-arranged, omitted, eliminated, and/or implemented in any other way. Further, the example consumer device 310, the example courier device 510, and/or the example return coordinator server 710, may be implemented by hardware alone or by hardware in combination with software and/or firmware. Thus, for example, any of the example consumer device 310, the example courier device 510, and/or the example return coordinator server 710, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example consumer device 310, the example courier device 510, and/or the example return coordinator server 710 of FIG. 7 may include one or more elements, processes, and/or devices in addition to, or instead of, those illustrated in FIG. 7, and/or may include more than one of any or all of the illustrated elements, processes and devices.

Figure 9:
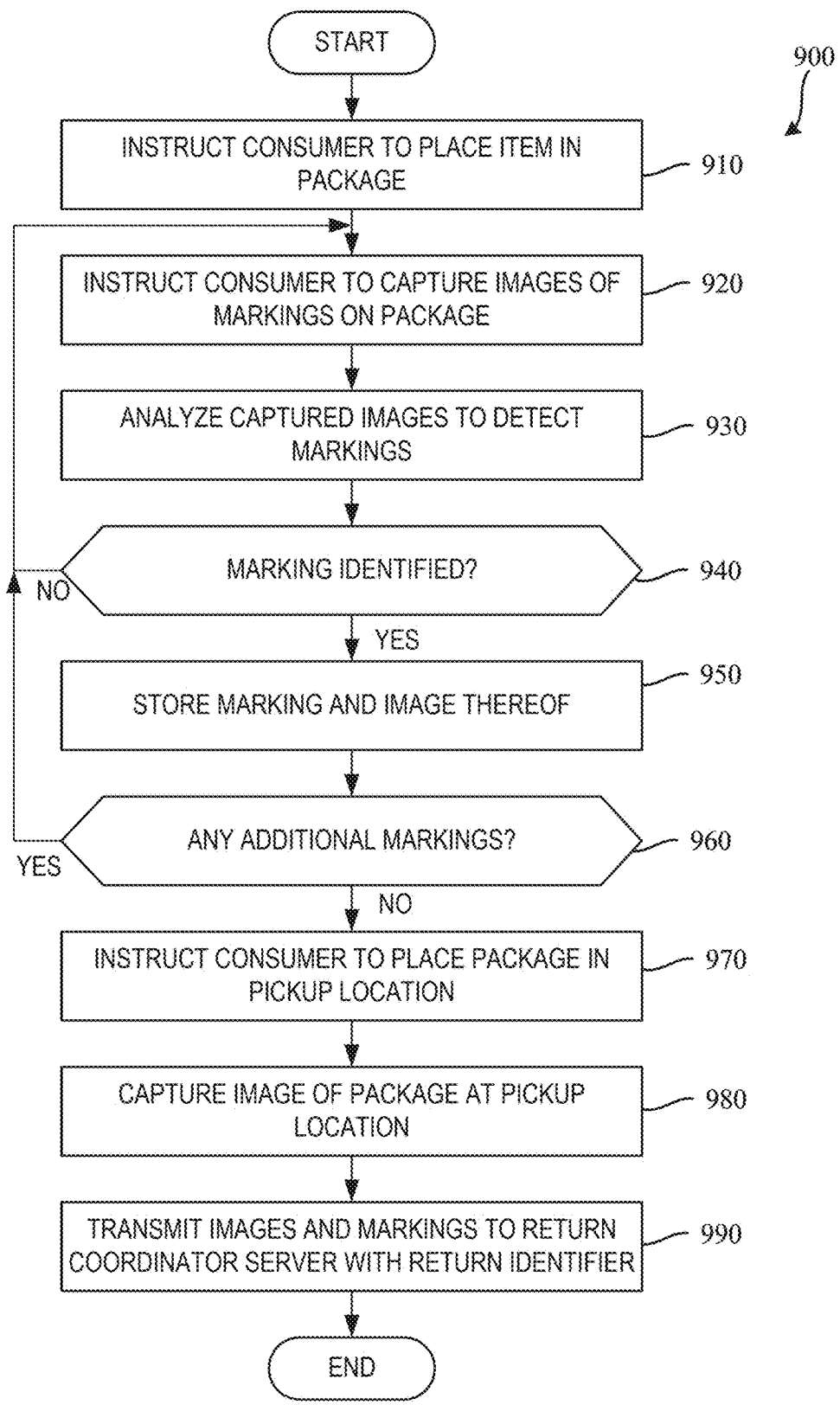
FIG. 9 is a flowchart representative of example machine readable instructions and/or example operations that may be executed, instantiated, and/or performed by programmable circuitry to capture images and/or markings from a package and provide those images and/or markings to the return coordination server.

A flowchart representative of example machine readable instructions, which may be executed by programmable circuitry to implement and/or instantiate the consumer device 310 of FIG. 7 and/or representative of example operations which may be performed by programmable circuitry to implement and/or instantiate the consumer device 310 of FIG. 7, is shown in FIG. 9. A flowchart representative of example machine readable instructions, which may be executed by programmable circuitry to implement and/or instantiate the courier device 510 of FIG. 7 and/or representative of example operations which may be performed by programmable circuitry to implement and/or instantiate the example courier device 510 of FIG. 7, is shown in FIG. 10.

The machine readable instructions of FIGS. 9 and/or 10 may be one or more executable programs or portion(s) of one or more executable programs for execution by programmable circuitry such as the programmable circuitry 1112 shown in the example processor platform 1100 discussed below in connection with FIG. 11 and/or may be one or more function(s) or portion(s) of functions to be performed by the example programmable circuitry (e.g., an FPGA) discussed below in connection with FIGS. 12 and/or 13. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 9 and/or 10, many other methods of implementing the example the consumer device, the courier device, or the return coordinator server may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 9 and/or 10 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

Figure 8:
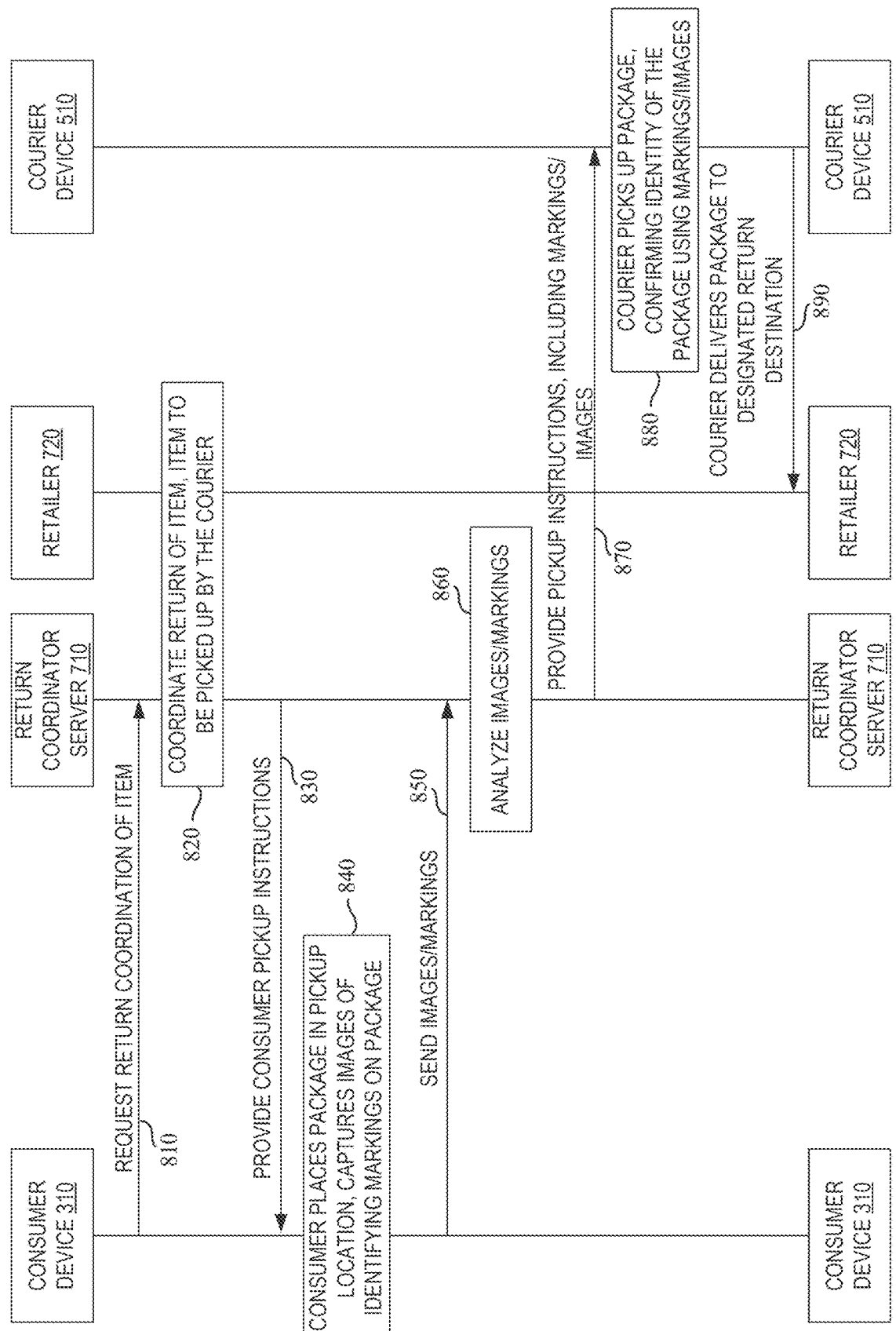
FIG. 8 is a sequence diagram illustrating a sequence of operations performed by the consumer (and/or consumer device), the return coordination server, the retailer, and the courier (and/or courier device).

FIG. 8 is a sequence diagram illustrating a sequence of operations performed by the consumer 300 (and/or consumer device 310), the return coordination server 710, the retailer 720, and the courier 500 (and/or courier device 510). The example sequence begins when the consumer 300, using the consumer device 310, requests return coordination from the return coordination server 710. (Arrow 810).

The return coordination server 710 interacts with the retailer 720 to coordinate return of the item on behalf of the consumer. (Block 820). In examples disclosed herein, the example return coordination server 710 may utilize one or more Large Language Models (LLMs) to facilitate interaction with the retailer 720. The return coordination server 710 identifies that the item is to be picked up (e.g., by the courier 500), and provides pickup instructions to the consumer 300. (Arrow 830). Such pickup instructions may identify how, for example, the consumer is to place an item in a package, and/or other instructions on how to prepare for pickup of the package.

The consumer follows the provided pickup instructions, placing the package in the designated pickup location, and capturing images of identifying markings on the package. (Block 840). The consumer device 310 sends the captured images and/or markings to the return coordination server 710. (Arrow 850).

In the illustrated example of FIG. 8, the return coordinator server 710 analyzes the images or markings provided by the consumer to extract identifying information such as barcodes, text, etc. (Block 860). In some examples, such analysis is performed by the consumer device 310.

The return coordination server 710 communicates the pickup instructions to the courier 500 and/or courier device 510. (Arrow 870). This communication includes any relevant identifying markings and/or images captured by the consumer device at block 840.

The courier 500 using the courier device 510 follows the provided pickup instructions to locate the package at the designated pickup location, and confirms its identity using the markings and/or images received from the return coordination server 710. (Block 880). In some examples, a camera of the courier device 510 is used to capture an image of the package and extract markings (e.g., barcodes, text, etc.) present on the package and compare the extracted markings to determine whether the correct package has been identified. In examples disclosed herein, the markings include markings that are not related to transit of the package (e.g., markings other than a shipping label). In some examples, the markings utilized for identifying a package may be related to transit of the package to a prior destination. For example, a previously used shipping label may be useful in identifying a package, even though that previously used shipping label is not used for the transit related to the pickup (e.g., to a new destination not associated with the previously used shipping label). In some examples, multiple markings may be identified and used to confirm the identity of the package to the courier.

Finally, the courier 500 delivers the package to the designated return destination. (Arrow 890). The example retailer 720, having received the package may then continue with processing of the requested return. The example process of FIG. 8 then terminates, but may be repeated to facilitate return of a subsequent item.

FIG. 9 is a flowchart representative of example machine readable instructions and/or example operations 900 that may be executed, instantiated, and/or performed by programmable circuitry to capture images and/or markings from a package and provide those images and/or markings to the return coordination server 710. The example machine-readable instructions and/or the example operations 900 of FIG. 9 begin at block 910, at which the consumer device 310 instructs the consumer to place an item to be returned in a package (e.g., a box and/or other shipping container). (Block 910). In some examples, the package may represent the original packaging material of the item to be returned (e.g., as opposed to a shipping container/box).

The consumer device 310 then instructs the consumer to manipulate the consumer device 310 to capture images of identifying markings on the package. (Block 920). These markings may include barcodes, QR codes, or other unique identifiers that help differentiate the package from others during the return process.

The consumer device 310 analyzes the captured image(s) to detect and identify any markings present on the package. (Block 930). This analysis may involve image processing techniques, such as edge detection, pattern recognition algorithms, barcode detection, etc., to ensure accurate identification of the markings. (Block 930). If no marking is detected during this process (e.g., block 940 returns a result of NO), the sequence returns to block 920 where the consumer is instructed to manipulate the consumer device 310 until a valid marking is identified. (e.g., until block 940 returns a result of YES).

Once a valid marking has been identified (e.g., block 940 returns a result of YES). The consumer device 310 stores both the detected marking and its corresponding image for later transmission to the return coordination server 710. (Block 950). This information will be used during the courier pickup process to verify the identity of the package. In some examples, this image is not stored and/or transmitted to the return coordination server 710 (e.g., solely the detected markings are provided).

The example consumer device 310 determines whether a threshold number of identifying markings have been identified. (Block 960). In some examples, the number of identified markings is compared against a threshold number to determine whether additional markings are to be identified. Detecting a larger number of markings (e.g., a higher threshold) enables more efficient identification of the correct package by the courier.

The consumer device 310 instructs the consumer 300 to place the package in a designated pickup location and capture an image of the package at that location. (Block 970). Such an additional image assists with efficient collection and/or identification of the package. In some examples, the capturing of this image is used to signify that the package is ready for pickup to the courier.

The consumer device 310 transmits both the captured image from block 980 and the previously detected markings (from block 950) along with a unique return identifier to the return coordination server. (Block 990). This information enables the return coordination server 710 to, via the courier device 510, efficiently verify and/or identify that the correct package is being picked up by a courier 510. The example process 900 of FIG. 9 then terminates, but may be re-executed at a later time to enable capturing of images for a subsequent item/package to be obtained by a courier.

Figure 10:
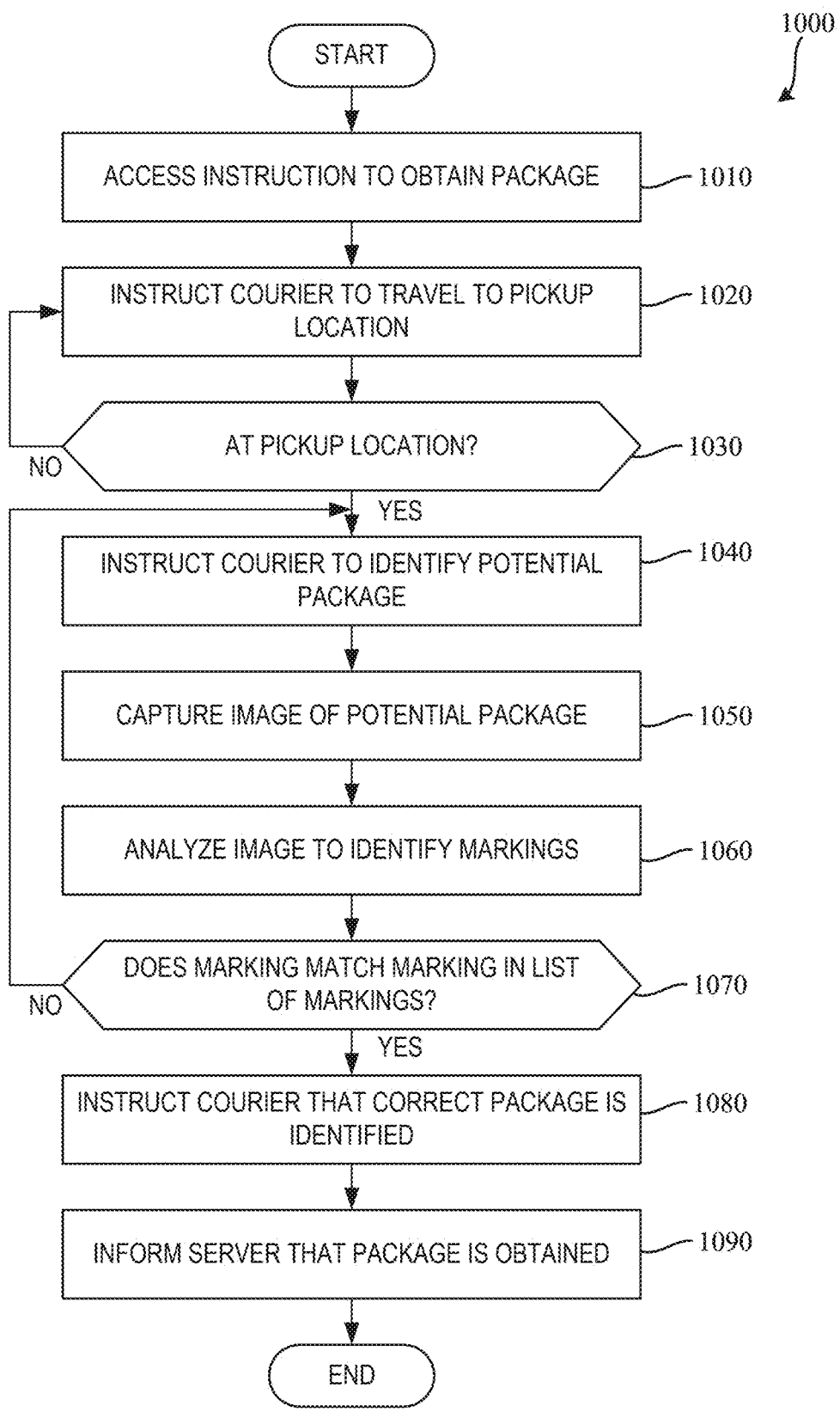
FIG. 10 is a flowchart representative of example machine readable instructions and/or example operations that may be executed, instantiated, and/or performed by programmable circuitry to identify a package for pickup.

FIG. 10 is a flowchart representative of example machine readable instructions and/or example operations 1000 that may be executed, instantiated, and/or performed by programmable circuitry to identify a package for pickup. The example machine-readable instructions and/or the example operations 1000 of FIG. 10 begin at block 1010, at which the courier device 510 accesses an instruction provided by the return coordination server 710 for identifying and obtaining a package. (Block 1010). These instructions may include specific details about how to identify the correct package at the pickup location based on unique markings and/or other identifiers present on the package.

Once the instructions have been accessed in block 1010, the courier device 510 instructs the courier 510 travel to the pickup location. (Block 1020). In some examples, the courier device 510 may confirm that the courier 500 is at the pickup location based on information from a Global Positioning System (GPS). If the courier device 510 has not yet arrived at the pickup location (e.g., block 1030 returns a result of NO), the process is continued until the courier device 510 is at the pickup location (e.g., until block 1030 returns a result of YES).

The courier device instructs the courier 500 to locate and identify a potential package at the designated pickup location. (Block 1040). Upon arriving at the pickup location and after confirming that all necessary equipment is available (e.g., scanner or camera), the courier device 510 instructs the courier 500 to identify a potential package in the area by capturing images of a package's markings and/or barcodes. (Block 1050).

The courier device 510 analyzes the image(s) captured in block 1050 to detect and identify any markings present on the potential packages. (Block 1060). This analysis may involve image processing techniques, such as edge detection, pattern recognition, barcode detection, etc., to identify the markings.

The courier device 510 determines whether the identified marking is included in the list of markings provided by the return coordination server 710. (Block 1070). If the marking does not match a marking included in the list of markings, then the package is assumed to not be the correct package. (Block 1070 returns a result of NO). The sequence returns to block 1040 for the courier to continue searching and capturing images of potential packages until a valid marking is identified.

In some examples, a plurality of markings may be identified and compared to the markings in the list of markings before instructing the courier to identify a subsequent package (e.g., markings from two faces of the package may be identified). For example, if a consumer failed to scan a marking on a package, and that missed marking happened to be the first marking scanned by the courier device 510, such an approach would avoid a situation where the courier would attempt to inspect other packages before returning to discover that the first package was the correct package.

If the detected marking(s) match one or more known markings in the list of markings provided by the return coordination server 710, the courier device 510 informs the courier that the correct package is identified. (Block 1080). Such information may be presented by way of any visual, audio, or physical indicators (e.g., screen flashes, sounds, vibration, etc.). Such information may instruct the courier 500 to proceed with obtaining the package and to continue with the requested delivery.

The courier device 510 transmits a confirmation message to the return coordination server 710 indicating that the pickup process for this particular item has been completed. (Block 1090). This information allows the return coordination server 710 to update its records and manage the remaining steps in the return process efficiently.

Figure 11:
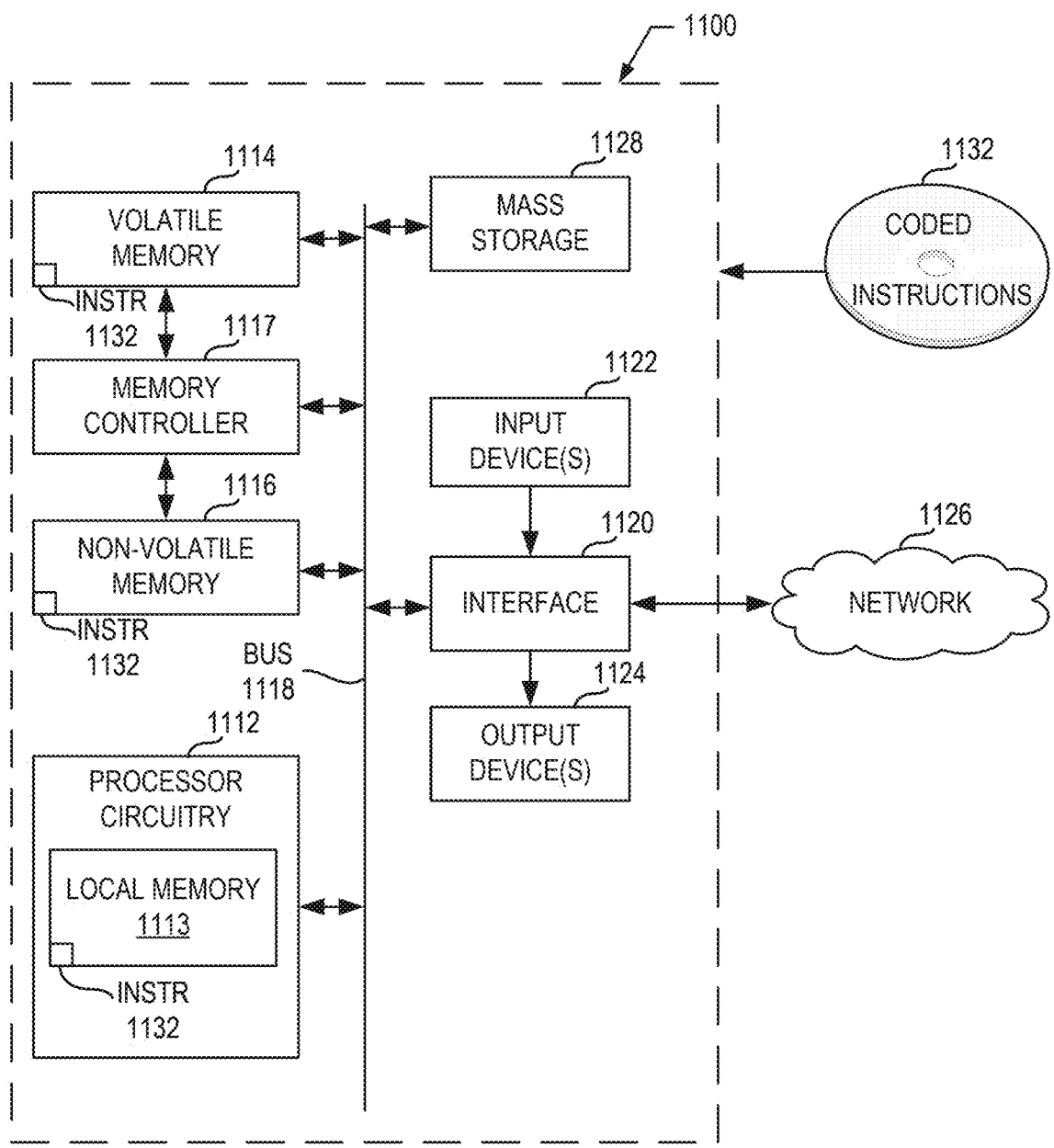
FIG. 11 is a block diagram of an example processing platform including programmable circuitry structured to execute, instantiate, and/or perform the example machine readable instructions and/or perform the example operations of FIGS. 9 and/or 10 to implement the consumer device, the courier device, or the return coordinator server of FIG. 7.

FIG. 11 is a block diagram of an example programmable circuitry platform 1100 structured to execute and/or instantiate the example machine-readable instructions and/or the example operations of FIGS. 9 and/or 10 to implement the consumer device, the courier device, or the return coordinator server of FIG. 7. The programmable circuitry platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 1100 of the illustrated example includes programmable circuitry 1112. The programmable circuitry 1112 of the illustrated example is hardware. For example, the programmable circuitry 1112 can be implemented by one or more integrated circuits, logic circuits, FPGAs, microprocessors, CPUs, GPUs, DSPs, and/or microcontrollers from any desired family or manufacturer. The programmable circuitry 1112 may be implemented by one or more semiconductor based (e.g., silicon based) devices.

The programmable circuitry 1112 of the illustrated example includes a local memory 1113 (e.g., a cache, registers, etc.). The programmable circuitry 1112 of the illustrated example is in communication with main memory 1114, 1116, which includes a volatile memory 1114 and a non-volatile memory 1116, by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117. In some examples, the memory controller 1117 may be implemented by one or more integrated circuits, logic circuits, microcontrollers from any desired family or manufacturer, or any other type of circuitry to manage the flow of data going to and from the main memory 1114, 1116.

The programmable circuitry platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1122 are connected to the interface circuitry 1120. The input device(s) 1122 permit(s) a user (e.g., a human user, a machine user, etc.) to enter data and/or commands into the programmable circuitry 1112. The input device(s) 1122 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1124 are also connected to the interface circuitry 1120 of the illustrated example. The output device(s) 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1100 of the illustrated example also includes one or more mass storage discs or devices 1128 to store firmware, software, and/or data. Examples of such mass storage discs or devices 1128 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 1132, which may be implemented by the machine readable instructions of FIGS. 9 and/or 10, may be stored in the mass storage device 1128, in the volatile memory 1114, in the non-volatile memory 1116, and/or on at least one non-transitory computer readable storage medium such as a CD or DVD which may be removable.

Figure 12:
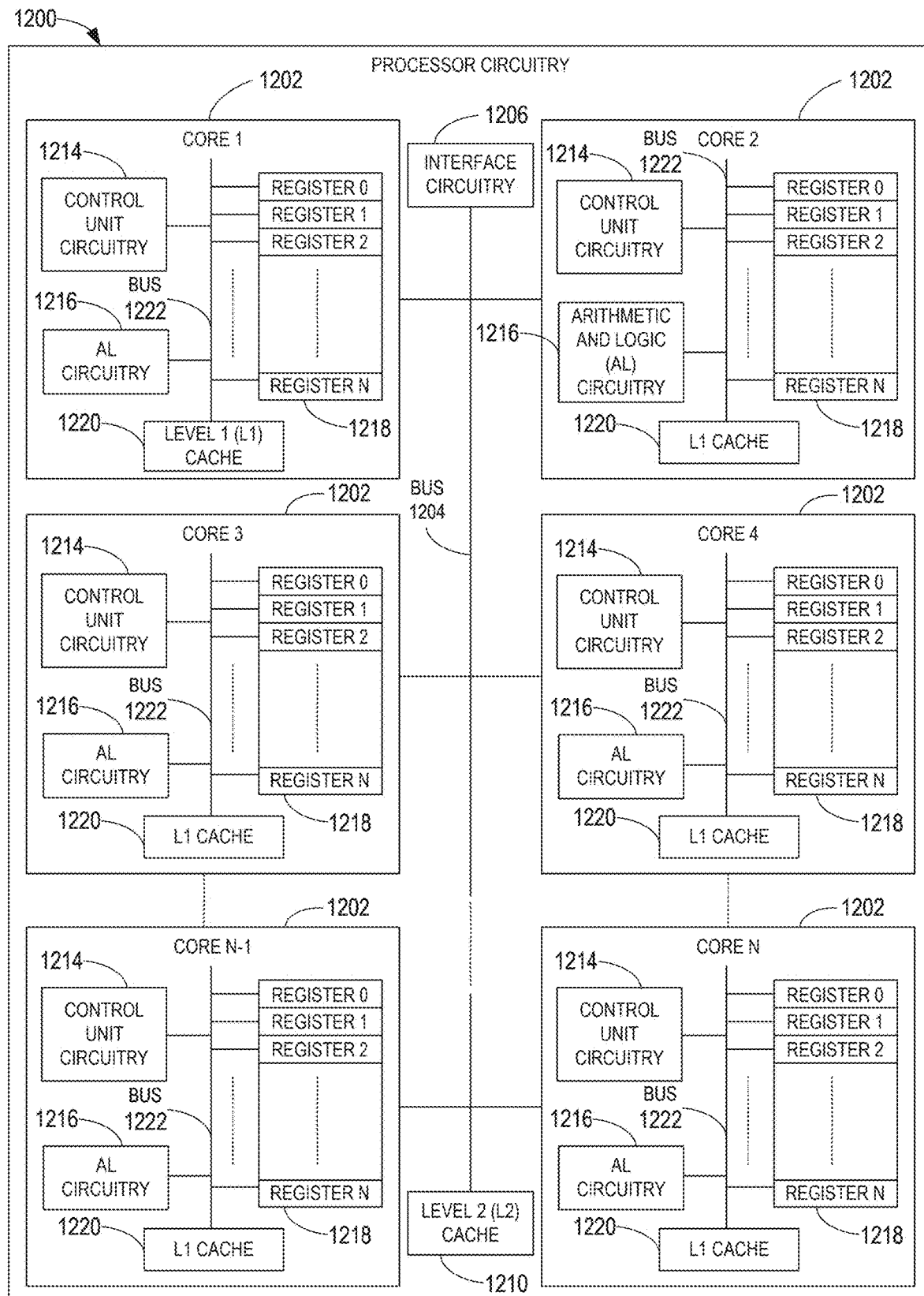
FIG. 12 is a block diagram of an example implementation of the programmable circuitry of FIG. 11.

FIG. 12 is a block diagram of an example implementation of the programmable circuitry 1112 of FIG. 11. In this example, the programmable circuitry 1112 of FIG. 11 is implemented by a microprocessor 1200. For example, the microprocessor 1200 may be a general-purpose microprocessor (e.g., general-purpose microprocessor circuitry). The microprocessor 1200 executes some or all of the machine-readable instructions of the flowcharts of FIGS. 9 and/or 10 to effectively instantiate the circuitry of FIG. 2 as logic circuits to perform operations corresponding to those machine readable instructions. In some such examples, the circuitry of FIG. 7 is instantiated by the hardware circuits of the microprocessor 1200 in combination with the machine-readable instructions. For example, the microprocessor 1200 may be implemented by multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine readable instructions and/or operations represented by the flowcharts of FIGS. 9 and/or 10.

The cores 1202 may communicate by a first example bus 1204. In some examples, the first bus 1204 may be implemented by a communication bus to effectuate communication associated with one(s) of the cores 1202. For example, the first bus 1204 may be implemented by at least one of an Inter-Integrated Circuit (I2C) bus, a Serial Peripheral Interface (SPI) bus, a PCI bus, or a PCIe bus. Additionally or alternatively, the first bus 1204 may be implemented by any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2 cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1114, 1116 of FIG. 11). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the local memory 1220, and a second example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer based operations. In other examples, the AL circuitry 1216 also performs floating-point operations. In yet other examples, the AL circuitry 1216 may include first AL circuitry that performs integer-based operations and second AL circuitry that performs floating-point operations. In some examples, the AL circuitry 1216 may be referred to as an Arithmetic Logic Unit (ALU).

The registers 1218 are semiconductor-based structures to store data and/or instructions such as results of one or more of the operations performed by the AL circuitry 1216 of the corresponding core 1202. For example, the registers 1218 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure, such as by being distributed throughout the core 1202 to shorten access time. The second bus 1222 may be implemented by at least one of an I2C bus, a SPI bus, a PCI bus, or a PCIe bus.

Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages.

The microprocessor 1200 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1200, in the same chip package as the microprocessor 1200 and/or in one or more separate packages from the microprocessor 1200.

Figure 13:
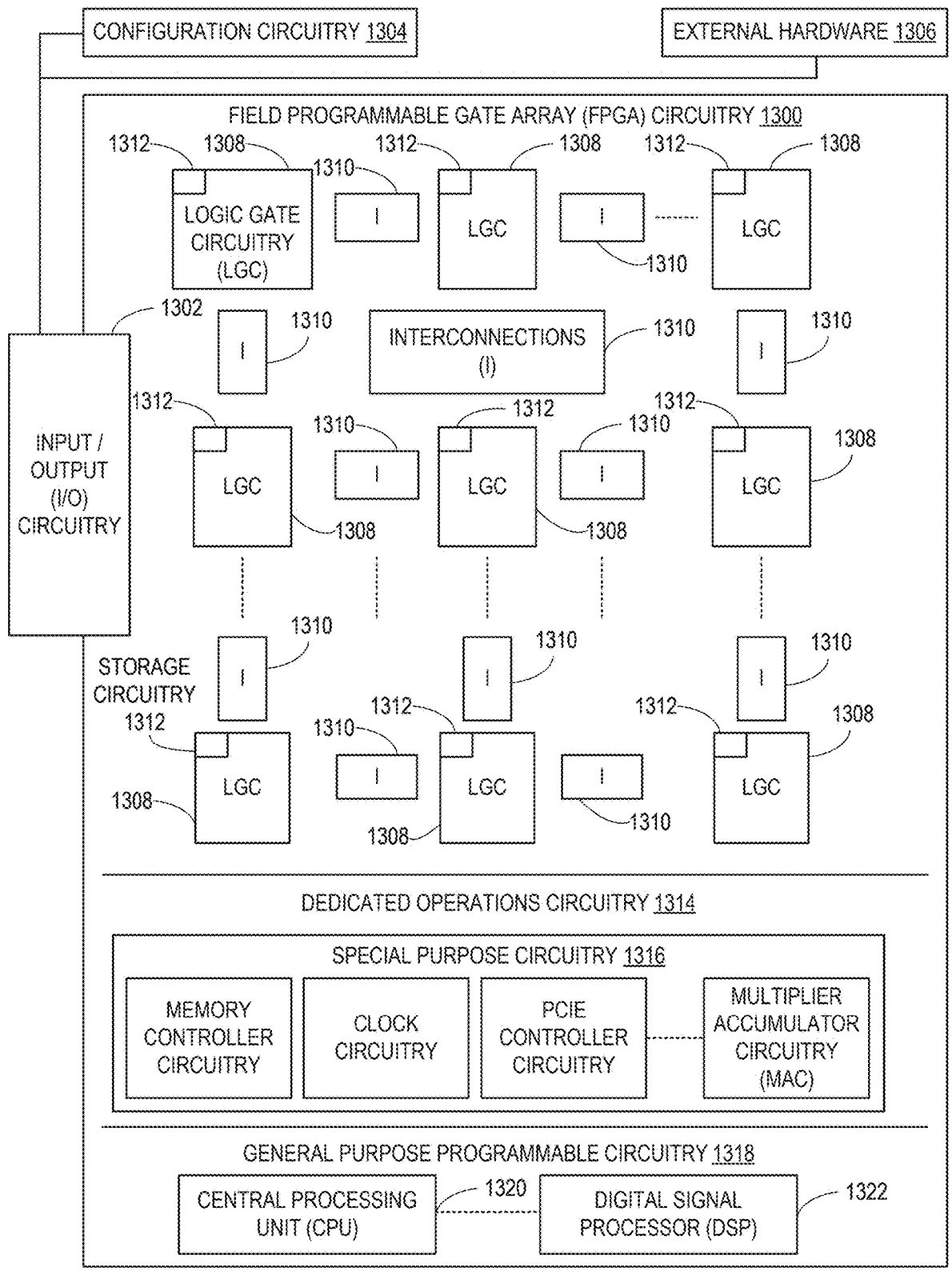
FIG. 13 is a block diagram of another example implementation of the programmable circuitry of FIG. 11.

FIG. 13 is a block diagram of another example implementation of the programmable circuitry 1112 of FIG. 11. In this example, the programmable circuitry 1112 is implemented by FPGA circuitry 1300. For example, the FPGA circuitry 1300 may be implemented by an FPGA. The FPGA circuitry 1300 can be used, for example, to perform operations that could otherwise be performed by the example microprocessor 1200 of FIG. 12 executing corresponding machine readable instructions. However, once configured, the FPGA circuitry 1300 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 1200 of FIG. 12 described above (which is a general purpose device that may be programmed to execute some or all of the machine readable instructions represented by the flowchart(s) of FIGS. 9 and/or 10 but whose interconnections and logic circuitry are fixed once fabricated), the FPGA circuitry 1300 of the example of FIG. 13 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 9 and/or 10. In particular, the FPGA circuitry 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 9 and/or 10. As such, the FPGA circuitry 1300 may be configured and/or structured to effectively instantiate some or all of the operations/functions corresponding to the machine readable instructions of the flowchart(s) of FIGS. 9 and/or 10 as dedicated logic circuits to perform the operations/functions corresponding to those software instructions in a dedicated manner analogous to an ASIC. Therefore, the FPGA circuitry 1300 may perform the operations/functions corresponding to the some or all of the machine readable instructions of FIGS. 9 and/or 10 faster than the general-purpose microprocessor can execute the same.

In the example of FIG. 13, the FPGA circuitry 1300 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1300 of FIG. 13 may access and/or load the binary file to cause the FPGA circuitry 1300 of FIG. 13 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1300 of FIG. 13 to cause configuration and/or structuring of the FPGA circuitry 1300 of FIG. 13, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1300 of FIG. 13 may access and/or load the binary file to cause the FPGA circuitry 1300 of FIG. 13 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1300 of FIG. 13 to cause configuration and/or structuring of the FPGA circuitry 1300 of FIG. 13, or portion(s) thereof.

The FPGA circuitry 1300 of FIG. 13, includes example input/output (I/O) circuitry 1302 to obtain and/or output data to/from example configuration circuitry 1304 and/or external hardware 1306. For example, the configuration circuitry 1304 may be implemented by interface circuitry that may obtain a binary file, which may be implemented by a bit stream, data, and/or machine-readable instructions, to configure the FPGA circuitry 1300, or portion(s) thereof. In some such examples, the configuration circuitry 1304 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1306 may be implemented by external hardware circuitry. For example, the external hardware 1306 may be implemented by the microprocessor 1200 of FIG. 12.

The FPGA circuitry 1300 also includes an array of example logic gate circuitry 1308, a plurality of example configurable interconnections 1310, and example storage circuitry 1312. The logic gate circuitry 1308 and the configurable interconnections 1310 are configurable to instantiate one or more operations/functions that may correspond to at least some of the machine readable instructions of FIGS. 9 and/or 10 and/or other desired operations. The logic gate circuitry 1308 shown in FIG. 13 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations/functions. The logic gate circuitry 1308 may include other electrical structures such as look-up tables (LUTs), registers (e.g., flip-flops or latches), multiplexers, etc.

The configurable interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example dedicated operations circuitry 1314. In this example, the dedicated operations circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 13 illustrate two example implementations of the programmable circuitry 1112 of FIG. 11, many other approaches are contemplated. For example, FPGA circuitry may include an on-board CPU, such as one or more of the example CPU 1320 of FIG. 12. Therefore, the programmable circuitry 1112 of FIG. 11 may additionally be implemented by combining at least the example microprocessor 1200 of FIG. 12 and the example FPGA circuitry 1300 of FIG. 13. In some such hybrid examples, one or more cores 1202 of FIG. 12 may execute a first portion of the machine readable instructions represented by the flowchart(s) of FIGS. 9 and/or 10 to perform first operation(s)/function(s), the FPGA circuitry 1300 of FIG. 13 may be configured and/or structured to perform second operation(s)/function(s) corresponding to a second portion of the machine readable instructions represented by the flowcharts of FIGS. 9 and/or 10, and/or an ASIC may be configured and/or structured to perform third operation(s)/function(s) corresponding to a third portion of the machine readable instructions represented by the flowcharts of FIGS. 9 and/or 10.

It should be understood that some or all of the circuitry of FIG. 7 may, thus, be instantiated at the same or different times. For example, same and/or different portion(s) of the microprocessor 1200 of FIG. 12 may be programmed to execute portion(s) of machine-readable instructions at the same and/or different times. In some examples, same and/or different portion(s) of the FPGA circuitry 1300 of FIG. 13 may be configured and/or structured to perform operations/ functions corresponding to portion(s) of machine-readable instructions at the same and/or different times.

In some examples, some or all of the circuitry of FIG. 7 may be instantiated, for example, in one or more threads executing concurrently and/or in series. For example, the microprocessor 1200 of FIG. 12 may execute machine readable instructions in one or more threads executing concurrently and/or in series. In some examples, the FPGA circuitry 1300 of FIG. 13 may be configured and/or structured to carry out operations/functions concurrently and/or in series. Moreover, in some examples, some or all of the circuitry of FIG. 7 may be implemented within one or more virtual machines and/or containers executing on the microprocessor 1200 of FIG. 12.

In some examples, the programmable circuitry 1112 of FIG. 11 may be in one or more packages. For example, the microprocessor 1200 of FIG. 12 and/or the FPGA circuitry 1300 of FIG. 13 may be in one or more packages. In some examples, an XPU may be implemented by the programmable circuitry 1112 of FIG. 11, which may be in one or more packages. For example, the XPU may include a CPU (e.g., the microprocessor 1200 of FIG. 12, the CPU 1320 of FIG. 13, etc.) in one package, a DSP (e.g., the DSP 1322 of FIG. 13) in another package, a GPU in yet another package, and an FPGA (e.g., the FPGA circuitry 1300 of FIG. 13) in still yet another package.

Figure 14:
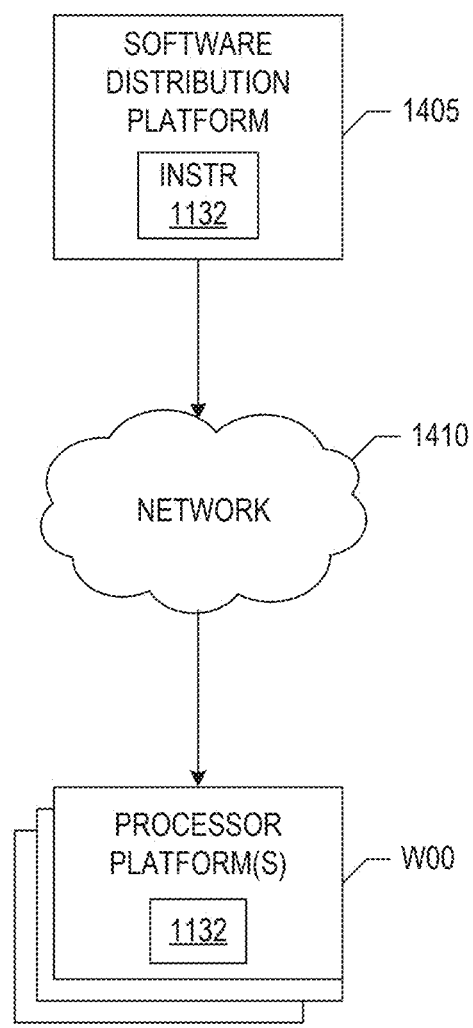
FIG. 14 is a block diagram of an example software/firmware/instructions distribution platform (e.g., one or more servers) to distribute software, instructions, and/or firmware (e.g., corresponding to the example machine readable instructions of FIGS. 9 and/or 10) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1405 to distribute software such as the example machine readable instructions 1132 of FIG. 11 to other hardware devices (e.g., hardware devices owned and/ or operated by third parties from the owner and/or operator of the software distribution platform) is illustrated in FIG. 14. The example software distribution platform 1405 may be implemented by any computer server, data facility, cloud service, etc., capable of storing and transmitting software to other computing devices. The third parties may be customers of the entity owning and/or operating the software distribution platform 1405. For example, the entity that owns and/or operates the software distribution platform 1405 may be a developer, a seller, and/or a licensor of software such as the example machine readable instructions 1132 of FIG. 11. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the machine readable instructions 1132, which may correspond to the example machine readable instructions of FIGS. 9 and/or 10, as described above. The one or more servers of the example software distribution platform 1405 are in communication with an example network 1410, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1132 from the software distribution platform 1405. For example, the software, which may correspond to the example machine readable instructions of FIGS. 9 and/or 10, may be downloaded to the example programmable circuitry platform 1100, which is to execute the machine readable instructions 1132 to implement the consumer device, the courier device, or the return coordinator server. In some examples, one or more servers of the software distribution platform 1405 periodically offer, transmit, and/or force updates to the software (e.g., the example machine readable instructions 1132 of FIG. 11) to ensure improvements, patches, updates, etc., are distributed and applied to the software at the end user devices. Although referred to as software above, the distributed "software" could alternatively be firmware.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

Notwithstanding the foregoing, in the case of referencing a semiconductor device (e.g., a transistor), a semiconductor die containing a semiconductor device, and/or an integrated circuit (IC) package containing a semiconductor die during fabrication or manufacturing, "above" is not with reference to Earth, but instead is with reference to an underlying substrate on which relevant components are fabricated, assembled, mounted, supported, or otherwise provided. Thus, as used herein and unless otherwise stated or implied from the context, a first component within a semiconductor die (e.g., a transistor or other semiconductor device) is "above" a second component within the semiconductor die when the first component is farther away from a substrate (e.g., a semiconductor wafer) during fabrication/manufacturing than the second component on which the two components are fabricated or otherwise provided. Similarly, unless otherwise stated or implied from the context, a first component within an IC package (e.g., a semiconductor die) is "above" a second component within the IC package during fabrication when the first component is farther away from a printed circuit board (PCB) to which the IC package is to be mounted or attached. It is to be understood that semiconductor devices are often used in orientation different than their orientation during fabrication. Thus, when referring to a semiconductor device (e.g., a transistor), a semiconductor die containing a semiconductor device, and/or an integrated circuit (IC) package containing a semiconductor die during use, the definition of "above" in the preceding paragraph (i.e., the term "above" describes the relationship of two parts relative to Earth) will likely govern based on the usage context.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real-world imperfections as will be understood by persons of ordinary skill in the art. For example, "approximately" and "about" may indicate such dimensions may be within a tolerance range of +/−10% unless otherwise specified herein.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that enable pick-up of packages using identifiers that are not related to shipment purposes. Such approaches reduce the amount of time taken to correctly identify a package by a courier, and also reduce the likelihood that an incorrect package is obtained.

Example 1 includes At least one non-transitory machine-readable medium comprising machine-readable instructions to cause at least one processor circuit to at least access a list of markings associated with an intended package to be collected for delivery to a destination location, access an image that includes at least a portion of a potential package, the image including a first marking of the potential package, the first marking not used for transportation of the potential package to the destination location, compare the first marking to a second marking in the list of markings, and when the first marking matches the second marking, identify the potential package as the intended package.

Example 2 includes the at least one non-transitory machine-readable medium of example 1, wherein the machine-readable instructions are to cause one or more of the at least one processor circuit to cause display of an instruction on a courier device, the instruction to prompt the courier device to capture the image of the potential package.

Example 3 includes the at least one non-transitory machine-readable medium of example 1 or example 2, wherein the intended package is positioned at a pickup location, wherein the machine-readable instructions are to cause one or more of the at least one processor circuit to access a location of the courier device, and cause display of the instruction after a determination that the location of the courier device is at the pickup location.

Example 4 includes the at least one non-transitory machine-readable medium of any one of examples 1-3, wherein the machine-readable instructions are to cause one or more of the at least one processor circuit to cause a camera of the courier device to capture the image after receipt of the instruction.

Example 5 includes the at least one non-transitory machine-readable medium of any one of examples 1-4, wherein the potential package is a first potential package and the instruction is a first instruction, in response to the first marking not matching any of the markings in the list of markings, the machine-readable instructions are to cause one or more of the at least one processor circuit to cause display of a second instruction to prompt the courier device to capture a second image of a second potential package.

Example 6 includes the at least one non-transitory machine-readable medium of any one of examples 1-5, wherein the list of markings includes a third marking indicating the destination location.

Example 7 includes the at least one non-transitory machine-readable medium of any one of examples 1-6, wherein the first marking is at least one of a handwritten marking or a barcode.

Example 8 includes the at least one non-transitory machine-readable medium of any one of examples 1-7, wherein the destination location is a current destination location, wherein the first marking is associated with transportation of the potential package to a prior destination location.

Example 9 includes an apparatus comprising interface circuitry, machine-readable instructions, and at least one processor circuit to be programmed by the machine-readable instructions to access a list of markings associated with an intended package to be collected for delivery to a destination location, access an image that includes at least a portion of a potential package, the image including a first marking of the potential package, the first marking not used for transportation of the potential package to the destination location, compare the first marking to a second marking in the list of markings, and when the first marking matches the second marking, identify the potential package as the intended package.

Example 10 includes the apparatus of example 9, wherein one or more of the at least one processor circuit is to cause display of an instruction on a courier device, the instruction to prompt the courier device to capture the image of the potential package.

Example 11 includes the apparatus of example 9 or example 10, wherein the intended package is positioned at a pickup location, wherein one or more of the at least one processor circuit is to access a location of the courier device, and cause display of the instruction after a determination that the location of the courier device is at the pickup location.

Example 12 includes the apparatus of any one of examples 9-11, wherein one or more of the at least one processor circuit is to cause a camera of the courier device to capture the image after receipt of the instruction.

Example 13 includes the apparatus of any one of examples 9-12, wherein the potential package is a first potential package and the instruction is a first instruction, in response to the first marking not matching any of the markings in the list of markings, the one or more of the at least one processor circuit is to cause display of a second instruction to prompt the courier device to capture a second image of a second potential package.

Example 14 includes the apparatus of any one of examples 9-13, wherein the list of markings includes a third marking indicating the destination location.

Example 15 includes the apparatus of any one of examples 9-13, wherein the first marking is at least one of a handwritten marking or a barcode.

Example 16 includes the apparatus of any one of examples 9-15, wherein the destination location is a current destination location, wherein the first marking is associated with transportation of the potential package to a prior destination location.

Example 17 includes a method comprising accessing, by at least one processor circuit programmed by at least one instruction, a list of markings associated with an intended package to be collected for delivery to a destination location, accessing, by one or more of the at least one processor circuit, an image that includes at least a portion of a potential package, the image including a first marking of the potential package, the first marking not used for transportation of the potential package to the destination location, comparing, by one or more of the at least one processor circuit, the first marking to a second marking in the list of markings, and when the first marking matches the second marking, identifying, by one or more of the at least one processor circuit, the potential package as the intended package.

Example 18 includes the method of example 17, further including displaying of an instruction on a courier device, the instruction to prompt the courier device to capture the image of the potential package.

Example 19 includes the method of example 17 or example 18, wherein the intended package is positioned at a pickup location, further including accessing a location of the courier device, and causing display of the instruction after a determination that the location of the courier device is at the pickup location.

Example 20 includes the method of any one of examples 17-19, further including causing a camera of the courier device to capture the image after receipt of the instruction.

Example 21 includes the method of any one of examples 17-20, wherein the potential package is a first potential package and the instruction is a first instruction, in response to the first marking not matching any of the markings in the list of markings, further including causing display of a second instruction to prompt the courier device to capture a second image of a second potential package.

Example 22 includes the method of any one of examples 17-21, wherein the list of markings includes a third marking indicating the destination location.

Example 23 includes the method of any one of examples 17-22, wherein the first marking is at least one of a handwritten marking or a barcode.

Example 24 includes the method of any one of examples 17-23, wherein the destination location is a current destination location, wherein the first marking is associated with transportation of the potential package to a prior destination location.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. At least one non-transitory machine-readable medium comprising machine-readable instructions to cause at least one processor circuit to at least:

access a list of markings associated with an intended package to be collected from a pickup location for delivery to a destination location;

determine that a courier device is located near the pickup location, the pickup location identified based on metadata extracted from a first image collected in connection with creation of the list of markings associated with the intended package;

after the determination that the courier device is near the pickup location, cause presentation of an instruction to instruct a courier to capture a second image of at least a portion of a potential package placed at the pickup location;

access the second image, the second image including at least the portion of the potential package, the second image captured by an image capture device of the courier device;

analyze the second image to extract a first marking of the potential package, the first marking not used for transportation of the potential package to the destination location;

compare the first marking to a second marking in the list of markings; and after a determination that the first marking matches the second marking, cause presentation of a visual confirmation at the courier device, the visual confirmation to identify the potential package as the intended package.

2. The at least one non-transitory machine-readable medium of claim 1, wherein the potential package is a first potential package and the instruction is a first instruction, in response to the first marking not matching any of the markings in the list of markings, the machine-readable instructions are to cause one or more of the at least one processor circuit to cause display of a second instruction to prompt the courier device to capture a second image of a second potential package.

3. The at least one non-transitory machine-readable medium of claim 1, wherein the list of markings includes a third marking indicating the destination location.

4. The at least one non-transitory machine-readable medium of claim 1, wherein the first marking is a barcode that was previously used within a warehouse setting.

5. The at least one non-transitory machine-readable medium of claim 1, wherein the destination location is a current destination location, wherein the first marking is associated with transportation of the potential package to a prior destination location to which the potential package was delivered.

6. An apparatus comprising:
an image capture device;
interface circuitry;
machine-readable instructions; and
at least one processor circuit to be programmed by the machine-readable instructions to:
- access a list of markings associated with an intended package to be collected from a pickup location for delivery to a destination location;
- determine that the apparatus is located at the pickup location, the pickup location identified based on metadata extracted from a first image collected in connection with creation of the list of markings associated with the intended package;
- after the determination that the apparatus is located at the pickup location, cause presentation of an instruction to instruct a courier to capture a second image of at least a portion of a potential package placed at the pickup location;
- access, from the image capture device, the second image that includes at least the portion of a potential package;
- analyze the second image to extract a first marking of the potential package, the first marking not used for transportation of the potential package to the destination location;
- compare the first marking to a second marking in the list of markings; and
- after a determination that the first marking matches the second marking, cause presentation of a visual confirmation at the apparatus, the visual confirmation to identify the potential package as the intended package.

7. The apparatus of claim 6, wherein the potential package is a first potential package, the instruction is a first instruction, and in response to the first marking not matching any of the markings in the list of markings, the one or more of the at least one processor circuit is to cause display of a second instruction to prompt the courier device to capture a second image of a second potential package.

8. The apparatus of claim 6, wherein the list of markings includes a third marking indicating the destination location.

9. The apparatus of claim 6, wherein the first marking is a barcode that was previously used within a warehouse setting.

10. The apparatus of claim 6, wherein the destination location is a current destination location, wherein the first marking is associated with transportation of the potential package to a prior destination location top which the potential package was delivered.

11. A method comprising:
- accessing, by at least one processor circuit programmed by at least one instruction, a list of markings associated with an intended package to be collected from a pickup location for delivery to a destination location;
- determining that a courier device is within a threshold distance of the pickup location, the pickup location identified based on metadata extracted from a first image used in connection with creation of the list of markings associated with the intended package;
- instructing, after the determination that the courier device is within the threshold distance of the pickup location, a courier to capture a second image of at least a portion of the potential package placed at the pickup location;
- accessing, by one or more of the at least one processor circuit, the second image that includes at least the portion of the potential package, the image captured by an image capture device of the courier device;
- analyzing the second image to extract a first marking of the potential package, the first marking not used for transportation of the potential package to the destination location;
- comparing, by one or more of the at least one processor circuit, the first marking to a second marking in the list of markings; and
- after a determination that the first marking matches the second marking, by one or more of the at least one processor circuit, presenting a visual confirmation at the courier device, the visual confirmation to identify the potential package as the intended package.

* * * * *